Aug. 20, 1940.   C. E. HEILIG   2,212,098
LOCOMOTIVE DRIVING WHEEL
Filed Sept. 24, 1937   2 Sheets-Sheet 1
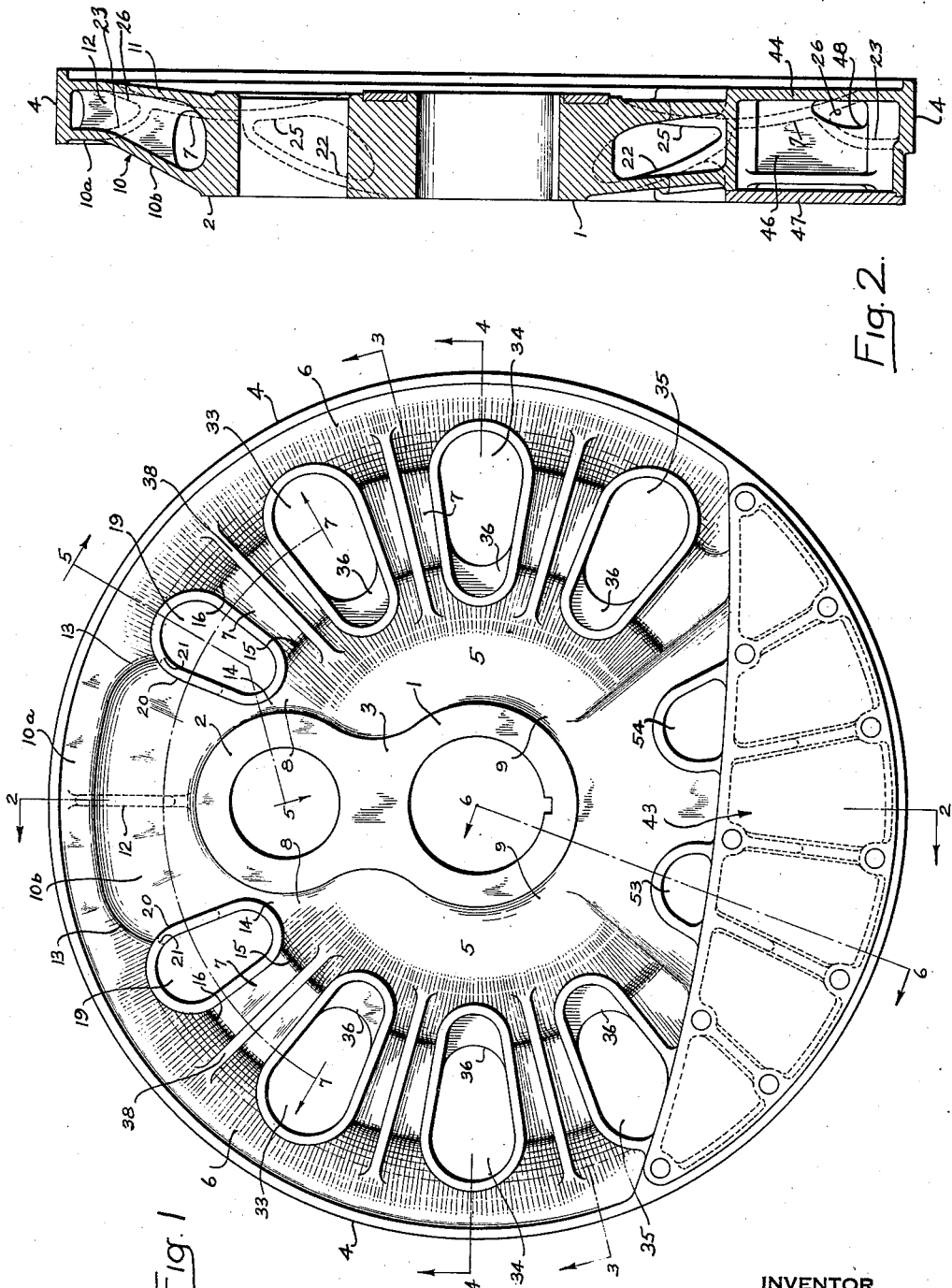
INVENTOR
CHARLES E. HEILIG
BY
ATTORNEY Aug. 20, 1940.  C. E. HEILIG  2,212,098
LOCOMOTIVE DRIVING WHEEL
Filed Sept. 24, 1937  2 Sheets-Sheet 2
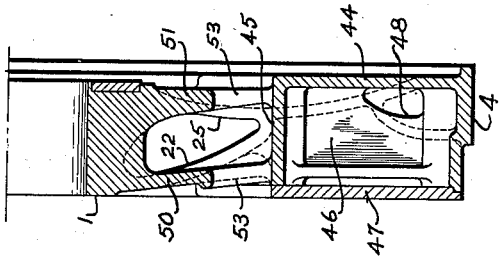
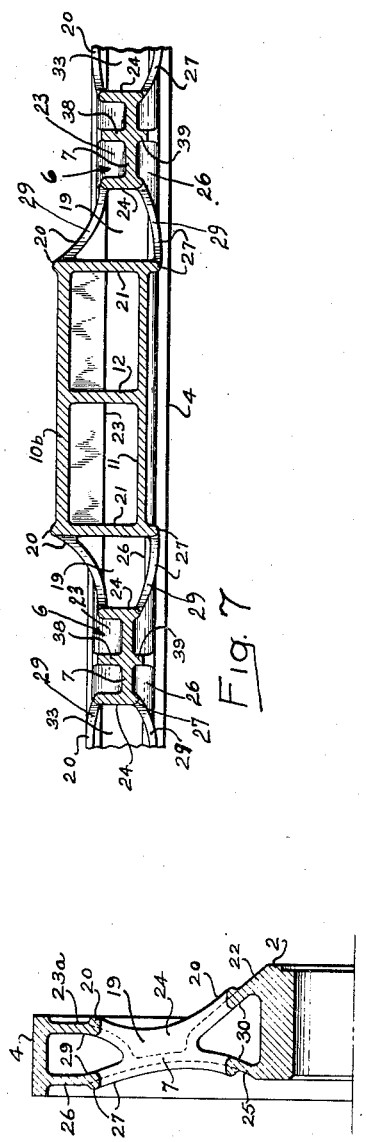
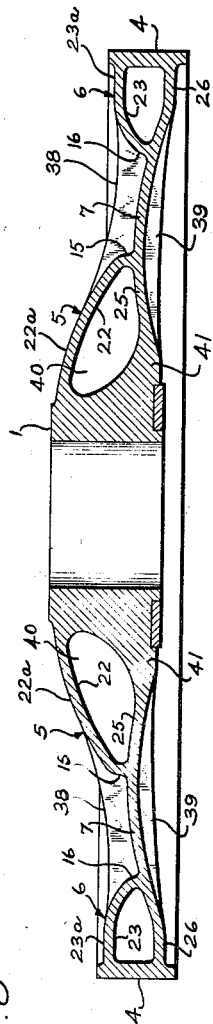
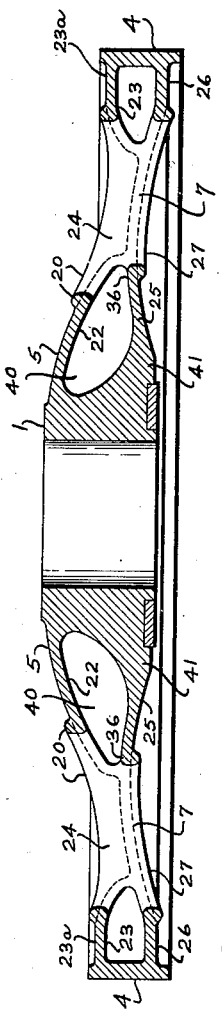
INVENTOR
CHARLES E. HEILIG
BY
ATTORNEY Patented Aug. 20, 1940

2,212,098

UNITED STATES PATENT OFFICE 2,212,098

LOCOMOTIVE DRIVING WHEEL

Charles E. Heilig, Philadelphia, Pa.

Application September 24, 1937, Serial No. 165,570

8 Claims. (Cl. 295—28)

This invention relates generally to locomotive driving wheels and more particularly to an improvement in the general type of wheel shown in Fawcett Patent No. 2,065,217.

It is an object of my invention to provide an improved combination of elements arranged in a cooperative structural and functional manner that will retain the fundamental characteristics of the Fawcett type wheel while at the same time providing a wheel that is economical in manufacture and efficient in operation together with having considerable strength consistent with minimum weight.

Other objects and advantages will be more apparent to those skilled in the art from the following description of the accompanying drawings in which:

Fig. 1 is a side elevation of my improved wheel;

Fig. 2 is a vertical section taken on the line 2—2 of Fig. 1;

Fig. 3 is a horizontal section viewed upwardly on the line 3—3 of Fig. 1;

Fig. 4 is a view similar to Fig. 3 but taken on the line 4—4 of Fig. 1;

Fig. 5 is a section taken on the line 5—5 of Fig. 1;

Fig. 6 is a section taken on the line 6—6 of Fig. 1;

Fig. 7 is a circular section taken on the line 7—7 of Fig. 1.

In the specific embodiment of the invention which is shown herein for purposes of illustration, the driving wheel is integrally cast and includes a driving wheel center having an axle hub 1 and a crankpin hub 2 joined by a reduced neck portion 3. These hubs and the juncture 3 are preferably of uniform axial depth and solid throughout. A rim 4 upon which is normally mounted a tire (not shown) is preferably imperforate around its periphery and is connected to the driving wheel center by inner and outer substantially triangular hollow walls 5 and 6 connected by a concave-convex perforated disc generally indicated at 7. The hubs and rims respectively form the bases of the inner and outer triangular walls. The inner triangular walls 5 extend across the reduced neck 3 and for substantial distances as indicated at 8 and 9 around the circumference of the hubs 1 and 2. The outer triangular walls 6 also extend around rim 4 between substantially the same radial planes which define the circumferential limits 8 and 9 of the inner triangular wall. From the foregoing it is seen that these inner and outer triangular wall portions extend around the wheel for a major portion of its circumference. A remaining portion of the circumference of rim 4 adjacent hub 2 is connected thereto by double spaced walls 10 and 11, Fig. 2, having a transverse supporting rib 12. As shown in Fig. 2, the outer wall 10 has a flat portion 10a adjacent the outside edge of rim 4 and a portion 10b indicated in an axial direction to outer edge of the crankpin hub. The double walls 10 and 11 merge with the triangular wall portions near the bases thereof as generally indicated at points 13 and 14, Fig. 1; in fact, wall portion 10a is substantially a continuation of portion 23a, Figs. 3 to 5, of the outer triangular wall. A similar relation exists between the back triangular wall 26 and the back double wall 11 as shown in Fig. 2. The apexes 15 and 16 (Figs. 1 and 3) of the inner and outer triangular wall portions 5 nd 6 are eliminated adjacent the point of said merger between the triangular portions 5 and 6 and the double walls 10 and 11, this elimination being by reason of a substantial size opening 19 extending transversely through web 7 and a portion of the triangular walls. The edge of this opening as shown in Figs. 1 and 5 is provided with a raised bead 20 adjacent the outer walls 22 and 23 of the triangular hollow portion and as these beads continue around the edge of said opening 19 they form on the right side of opening 19 a substantial flange or rib 24 across the single disc web 7. The bead remains unchanged in passing around the left side of opening 19 which side has a depth equal to the distance between the double walls 10 and 11. A transverse web 21 not only connects the double walls adjacent the left side of opening 19 but also forms one wall therefor opposite to flange 24. The inner walls 25 and 26 of said triangular portions are also provided with an edge bead 27 which however extends with uniform size across the back side of disc 7. The rib 24 merges with bead 27 adjacent disc 7, thereby providing a wall of substantial axial depth across the disc 7. The foregoing intersecting relation of opening 19 to the triangular walls provides substantial radial openings 29 and 30 whereby not only may core material be freely and thoroughly removed from the hollow space within the triangular walls with no reduction in strength but with some reduction in weight.

A series of similar but somewhat larger openings are provided at 33, 34 and 35 except that these openings as shown in Fig. 4 extend radially inwardly a greater distance in outer wall 22 than into lower wall 25, thereby causing a portion 36 of inner wall 25 to be seen in Fig. 1. The bead and rib construction of these additional openings is the same for opening 19 except that both sides of openings 33, 34 and 35 have ribs such as 24. In view of the otherwise similarity the same reference numbers are used for corresponding parts.

Interposed between each pair of adjacent openings is a radial rib 38 which as shown in Figs. 1 and 3 extends across disc 7 and thence over a substantial distance of outer walls 22 and 23 so that the edge of the rib smoothly merges with the surfaces of the base portions 22a and 23a of such walls. Ribs 39, Fig. 3, are similarly formed on the under side of disc 7 substantially in alignment with ribs 38 so as to form an axial continuation thereof. It will be noted, however, that ribs 39 extend for substantially the full length of the inner wall 25.

It will be noted from Fig. 3 that the disc portion 7 and inner walls 25 and 26 form a smooth gradually curved continuation of one another whereas the outer walls 22 and 23 merge with said gradually curving wall to form the shoulder like apexes 15 and 16. This structure is accomplished by providing the triangular walls with a hollow interior 40 of somewhat elliptical shape, thereby providing an outer wall 22 of substantially uniform thickness throughout its length whereas the inner wall 25 becomes of increasing thickness as indicated at 41 in approaching its juncture with the hubs and their neck 3. In this manner the relatively heavy hubs are joined to the relatively thin disc and back walls 7 and 25 by a gradually tapering construction that minimizes shrinkage strains whereas the outer walls 22 of the inner triangle are sufficiently arched with its shoulder like apex 15 to minimize shrinkage strains.

The foregoing general principles of construction are continued through that circumferential portion of the wheel containing a counterbalance pocket generally indicated at 43, Fig. 1. This pocket comprises as shown in Fig. 6 an inner flat wall 44 and a horizontal wall 45 with usual reinforcing ribs and flanges generally indicated at 46 and a cover plate 47. An opening 48 may be formed in each of the transverse ribs 46 to permit proper distribution of the molten counterweight material when poured into the pocket. My disc and triangular wall portions are brought into cooperative relation with the pocket structure by providing double spaced walls 50 and 51 whose inner surfaces substantially follow a portion of the elliptical form of walls 22 and 25 as the double walls approach hub 1, thereby causing the inner wall 51 to have a substantial taper when approaching pocket wall 45. The walls 50 and 51 are continuous in the inner and outer planes of the wheel except for two relatively small openings 53 and 54 extending through each of the walls 50 and 51. One end of these openings is formed by horizontal pocket wall 45. Thus core material may be readily and completely removed from between walls 50 and 51 while at the same time insuring maximum strength of this portion of the wheel. It will be understood that the wheel is substantially symmetrical about the vertical center line as viewed in Fig. 1 except, of course, the counterbalance is slightly off center for purposes of cross counterbalancing well known in present day art, and hence the description of one side of the wheel as heretofore given will suffice for the other side. It will also be understood that the various features and number and size of openings may be modified in accordance with different diameter wheels while still retaining the broad features herein disclosed.

From the foregoing disclosure it is seen that I have provided a locomotive driving wheel that is of maximum strength consistent with minimum weight and is materially free from shrinkage strains while at the same time permitting economical manufacture and thorough inspection of all walls on both sides thereof. As a result of these features, wheels of lighter weight and with a maximum factor of safety can be produced because with my improved arrangement there is less possibility of a defective wheel being produced and if any defects do occur they are readily observed or detected.

It will of course be understood that various changes in details of construction and arrangement of parts may be made by those skilled in the art without departing from the spirit of the invention as set forth in the appended claims.

I claim:

1. A locomotive driving wheel having axle and crankpin hubs, a rim, spaced walls arranged in substantially triangular relation to each other and extending around at least a portion of said hubs and similar triangularly arranged walls extending around at least a portion of said rim, and a single disc wall substantially forming a continuation of one side of the triangularly arranged walls located on one side of the wheel while the apex end of one of the opposing triangularly arranged walls is offset from said disc and turns axially into the same to form an annular-like shoulder defining the apex for said opposing wall.

2. A locomotive driving wheel having axle and crankpin hubs, a rim, and means connecting said rim and hubs including spaced walls arranged in substantially triangular relation to each other and extending around at least a portion of said hubs and a disc portion extending radially outward from the apex of said triangularly arranged walls, one of said walls and said disc having a common opening intersecting the apex of said triangularly arranged walls to provide a radial passage into the hollow interior formed between the spaced walls.

3. A locomotive driving wheel having axle and crankpin hubs, a rim, and means connecting said rim and hubs including spaced walls arranged in substantially triangular relation to each other and extending around at least a portion of said hubs and a disc portion extending radially outward from the apex of said triangularly arranged walls, one of said walls and said disc having a common opening which intersects the apex of said triangularly arranged walls to provide a radial passage into the hollow interior formed between the spaced walls and a flange adjacent the edge of said opening where it passes through said disc.

4. A locomotive driving wheel having axle and crankpin hubs, a rim, means connecting said rim and hubs including spaced walls arranged in substantially triangular relation to each other and extending around at least a portion of said hubs and a disc portion extending radially outward from the apex of said triangularly arranged walls, one of said walls and said disc having an opening adjacent the apex of said triangularly arranged walls and a flange adjacent the edge of said opening where it passes through said disc, and ribs circumferentially spaced from said opening and extending across the disc wall and connecting with a substantial portion of said triangularly arranged walls.

5. A locomotive driving wheel comprising, in combination, axle and crankpin hubs, a rim, and means connecting said hubs and rim including inner spaced walls arranged in substantially triangular form extending around at least a portion of said hubs and similar outer spaced walls arranged in triangular form extending around at least a portion of the rim, and a single disc wall connecting the apexes of said triangularly arranged portions, said disc wall and said inner and outer triangularly arranged walls having a common opening extending therethrough so that a portion of each of the triangularly arranged walls adjacent said apexes are removed to form oppositely extending radial openings into the spaced walls.

6. The combination set forth in claim 1 further characterized in that each of said triangularly arranged walls have their apexes formed in the manner of said axially turned offset portion to form annular like shoulders, and integral radial ribs extending radially from said inwardly turned shouldered portions of said triangularly arranged walls and across said disc wall.

7. The combination set forth in claim 1 further characterized in that said disc wall has an opening intersecting one of the shouldered wall portions for a substantial distance radially inwardly from the apex while the opposing wall of said triangularly arranged portion continues substantially solidly out to the apex.

8. The combination set forth in claim 1 further characterized in that said disc wall has an opening which substantially equally intersects both walls of the triangularly arranged portion adjacent the rim.

CHARLES E. HEILIG.